United States Patent [19]

Mottus et al.

[11] Patent Number: 4,695,611
[45] Date of Patent: Sep. 22, 1987

[54] LACTAM POLYMERIZATION INITIATORS

[75] Inventors: Edward H. Mottus, Ballwin; Ross M. Hedrick, St. Louis, both of Mo.

[73] Assignee: DSM Rim Nylon V.O.F., Geleen, Netherlands

[21] Appl. No.: 935,725

[22] Filed: Nov. 28, 1986

Related U.S. Application Data

[62] Division of Ser. No. 838,643, Mar. 11, 1986.

[51] Int. Cl.$^4$ ............................................. C08L 77/00
[52] U.S. Cl. ..................................... 525/432; 528/323
[58] Field of Search ................. 528/323, 324; 525/432

[56] References Cited

U.S. PATENT DOCUMENTS

| | | | |
|---|---|---|---|
| 2,277,152 | 12/1939 | Schlack. | |
| 2,682,526 | 7/1950 | Flory. | |
| 2,831,834 | 5/1951 | Magat. | |
| 3,410,833 | 5/1965 | Schaaf et al.. | |
| 3,423,372 | 1/1969 | Stealy | 528/315 |
| 3,427,289 | 2/1969 | Warner | 528/315 |
| 3,440,227 | 4/1969 | Baum | 528/314 |
| 3,721,652 | 3/1970 | Barnes | 528/312 |
| 4,038,470 | 3/1976 | Sthelicek | 525/342 |
| 4,119,615 | 9/1976 | Schulze | 528/343 |
| 4,133,803 | 10/1976 | Klein | 528/340 |
| 4,188,478 | 11/1978 | Goebel | 528/314 |
| 4,473,686 | 6/1983 | Grigo et al. | 525/184 |
| 4,490,520 | 12/1984 | Ogasa et al. | 528/315 |
| 4,523,025 | 10/1983 | Cusueida | 560/26 |
| 4,581,419 | 4/1986 | Gabbert et al. | 525/437 |
| 4,617,355 | 10/1986 | Gabbert et al. | 525/420 |

FOREIGN PATENT DOCUMENTS 1067153 5/1967 United Kingdom.

OTHER PUBLICATIONS

Sthelicek et al., "Alkaline Polymerization of 6-Caprolactam, XLYIII Fraction of Acyl Groups of the Activator Incorporated in a High-Molecular Weight Polymer", Collection Czechoslov. Chem. Commun. vol. 30, 1973, pp. 2274-2289.

Masar et al., "Soluble Copolymers of Lactam as Pre Polymers with End Amino Groups", Collection of Czech. Common. No. 43 No. 7 pp. 1683-1693 (1978).

Primary Examiner—Lewis T. Jacobs
Attorney, Agent, or Firm—Cushman, Darby & Cushman

[57] ABSTRACT

Disclosed are lactam polymerization initiators comprising at least two lactam terminal groups of the formula:

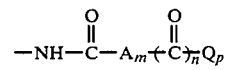

wherein Q is a lactam residue containing a $C_3$ to $C_{11}$ alkylene group and is bonded to a carbonyl through the nitrogen atom of the lactam; A is an aliphatic or aromatic hydrocarbyl or hydrocarbyl ether group; m is 0 or 1; when m is 0, n is 0 or 1 and p is 1; when m is 1, n is in the range of 1 to 3 and p=n; and an elastomeric backbone derived from a telechelic polyamine containing at least two primary or secondary amine groups. Also disclosed are a process for forming the same; nylon block copolymers produced therefrom; and a process for the polymerization thereof.

29 Claims, No Drawings

LACTAM POLYMERIZATION INITIATORS

This is a division of application Ser. No. 838,643, filed Mar. 11, 1986.

The present invention relates to lactam polymerization initiators, to a process for forming the same, to nylon block copolymers produced therefrom, and to a process for polymerization thereof.

Polymers containing polyamide segments and segments of another material have been disclosed in the art and are herein referred to as "nylon block copolymers". A combination of polyamide segments and segments of another polymeric material allows for the obtaining of block copolymers with unique combinations of properties. The properties can be varied by varying the polyamide and/or other polymeric segments in the block copolymer. Particularly useful are those block copolymers which contain alternating hard and soft segments. The hard segments (i.e., $T_g$ or $T_m$ above room temperature) provide thermoplasticity and the soft segments (i.e., $T_g$ below room temperature) provide elastomeric behavior; and, in combination, the alternating hard and soft segments provide toughened rigid systems suitable for use in the manufacture of fibers, fabrics, films and molding resins.

In U.S. Pat. Nos. 4,031,164, issued June 21, 1977, and 4,223,112, issued Sept. 16, 1980, both to Hedrick and Gabbert, there are taught nylon block copolymers containing nylon segments derived from lactam monomers and other polymeric blocks derived from polyols. Polyacyllactams provide linkages for the blocks in the nylon block copolymers taught therein. The Hedrick and Gabbert patents teach that the preparation of their block copolymers involves mixing together lactam monomer, polyol, lactam polymerization catalyst and the polyacyllactam. The process typically results in the formation of some polyamide homopolymer due to the polyacyllactams which are acyllactam containing materials, as hereinafter defined, reacting solely with lactam monomer. It is preferable to minimize the formation of homopolymer since it generally causes detrimental effects such as the reduction of impact properties of the molded nylon block copolymer.

A catalytic process for imide-alcohol condensation taught by Hedrick and Gabbert in U.S. Pat. No. Re 30,371, reissued Aug. 12, 1980, can be employed in the preparation of the Hedrick and Gabbert nylon block copolymers. Reacting a polyol and polyacyllactam in accordance with this process results in a mixture containing residual catalyst that may advantageously be removed or inactivated to reduce the potential difficulties in any subsequent preparation of nylon block copolymer moldings from said mixture.

Copending application, Ser. No. 467,626, now U.S. Pat. No. 4,581,419, issued Apr. 8, 1986, discloses lactam polymerization initiators, referred to as acyllactam functional materials, useful for preparing nylon block copolymers, which are formed in two steps by reacting a hydroxyl-containing material with an acid halide functional material containing two or more carboxylic acid halide groups to form a second acid halide functionalized material and then by reacting the second acid halide functional material with a lactam monomer to provide terminal lactam initiator groups. Such lactam polymerization initiators have the general formula:

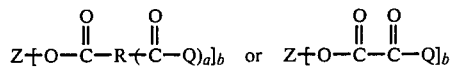

wherein Q is a lactam residue bonded to a carbonyl through the nitrogen atom of the lactam and has the structural formula:

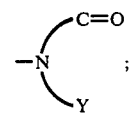

Y is a $C_3$–$C_{11}$ alkylene group; a is 1, 2 or 3; b is 2 or more; R is a di- or a polyvalent group selected from hydrocarbon groups and hydrocarbon groups containing ether linkages; and Z is a segment of a polyether, a polyester containing polyether segments, a hydrocarbon, a polysiloxane, or combinations thereof.

U.S. Pat. No. 4,490,520, issued to Ogasa et al, discloses the preparation of polyamides from lactam polymerization initiators and ω-lactam in the presence of an alkali catalyst. The lactam polymerization initiators are prepared from polyfunctional cocatalysts, e.g. from polyacyllactams, and a polyoxyalkylene amine either prior to or during the polymerization of the ω-lactam.

We have now discovered a method of preparing lactam polymerization initiators from amine-functionalized materials, such as the polyoxyalkylene polyamines, which provide nylon block copolymers possessing desirable physical properties and containing amide rather than ester linkages.

One aspect of the present invention is provided by the lactam polymerization initiators which can be employed in the preparation of nylon block copolymers. Another aspect is provided by the use of such initiators in the preparation of nylon block copolymers by a very fast reaction pathway, which is particularly useful in reaction injection molding processes, providing amide-linked products which are more hydrolytically and thermally stable than those in which the blocks are linked by ester groups and which have greater impact strength than amide-linked products prepared by methods disclosed in the art.

Lactam polymerization initiators according to the invention comprise at least two lactam terminal groups represented by the formula:

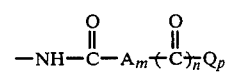

wherein Q is a lactam residue containing a $C_3$ to $C_{11}$ alkylene group, bonded to a carbonyl through the nitrogen atom of the lactam; A is an aliphatic or aromatic hydrocarbyl or hydrocarbyl ether group; m is 0 or 1, when m is 0, n is 0 or 1 and p is 1, and when m is 1, n is in the range of 1 to 3 and p=n; and an elastomeric backbone derived from a telechelic polyamine containing at least two primary amine groups. Such initiators are represented by the formula:

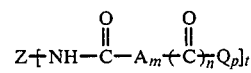

wherein Z is polyvalent radical derived from a telechelic polyamine containing at least 2 primary amine groups and is selected from the group consisting of polyoxyalkylene polyamines, oxyalkylene copolymer polyamines, polyalkadiene polyamines, alkadiene copolymer polyamines, polyalkene polyamines, alkene copolymer polyamines, and combinations thereof; t is at least 1; A, Q, m, n, and p are as previously specified or designated. Such initiators can be formed by reaction of an acyllactam monomer containing at least two acyllactam groups and a telechelic polyamine. In order to form a nylon block copolymer with superior properties, at least 90 mole %, preferably 95 mole %, of the amine groups of the polyamine should have been converted to the lactam terminal groups prior to any substantial lactam polymerization. Such may be accomplished by preforming the initiator or forming it in situ prior to exposure to lactam polymerization conditions.

Advantageously, the lactam polymerization initiator has a number average molecular weight from about 500 to about 15,000, and preferably, from about 1,000 to about 10,000. Preferred lactam polymerization initiators are those derived from polyether and polyhydrocarbon polyamines and having molecular weights of at least about 1,000 and, preferably, from about 2,000 to about 6,000. All references herein to molecular weight, unless otherwise indicated, shall mean number average molecular weight which is determined by methods well-known in the art.

Initiators according to the invention may be obtained by performing the following sequential steps which proceed at ambient temperature:

(a) complexing the acid halide groups of a polyfunctional acid halide with a tertiary amine;

(b) reacting at least one but less than all of the complexed acid halide groups with a lactam monomer represented by the formula

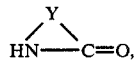

where Y is a $C_3$ to $C_{11}$ alkylene group to replace the halogen with lactam residue and form an ammonium halide salt;

(c) reacting at least 90 mole % of the remaining complexed acid halide groups with a polyfunctional primary amine to form amide groups; and (d) removing the ammonium halide salt.

Advantageously, the acid halide groups are in slight stoichiometric excess over the amine groups. In this process the acid halide groups react with the amine groups in the polyamine to form an amide linkage and a substituted ammonium halide byproduct. An example of this reaction is as follows:

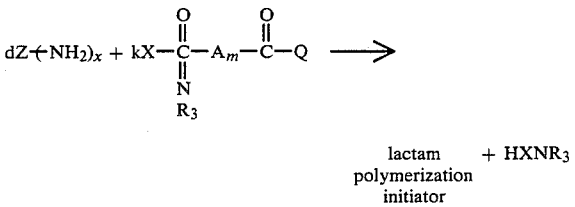

wherein X is chlorine or bromine, :$NR_3$ is a tertiary amine, Z, Q, A, and m are as previously described, and $k \geq dx$. It is recognized that some polyfunctional acid halide may contain more than one acid halide group following reaction with the lactam monomer in step (b) to form the initiator. In such a case the polyfunctional acid halide may couple two or more telechelic polyamines with the elimination of two substituted ammonium halide molecules per coupling reaction.

The initiator is advantageously formed in the presence of a non-interfering solvent, e.g. cyclohexane, toluene, tetrahydrofuran, or acetone. It may also be formed at elevated temperatures, e.g. 30° C. to 150° C., depending upon the nature of the solvent used. If a solvent is used, it may be removed by distillation following formation of the initiator.

Advantageously, the telechelic polyamine is of number average molecular weight in the range of about 300 to 10,000, preferably at least 500, and more preferably 1000, and is selected to provide a backbone of soft, elastomeric segments in the nylon block copolymer while the polylactam segments produced by addition polymerization of the lactam monomer onto the initiator provide hard, crystalline segments. Soft segments contribute a glass transition temperature, $T_g$, of less than about 0° C., preferably less than about −25° C., when they are incorporated into a nylon block copolymer. The glass transition temperature is conveniently measured by differential scanning calorimetry under nitrogen at a scanning rate of 10°–20° per minute. Such segments are advantageously derived from telechelic polyamines selected from the group consisting of polyoxyalkylene polyamines, oxyalkylene copolymer polyamines, polyalkadiene polyamines, alkadiene copolymer polyamines, polyalkene polyamines, alkene copolymer polyamines, and combinations thereof. The amount of elastomeric segments in the nylon block copolymers prepared by the process of the present invention can be varied between 10 and 90 weight percent of the copolymer, depending on the properties being sought.

Exemplary suitable polymeric hydrocarbon polyamines are polybutadiene diamine, polybutadiene polyamines and butadiene-acrylonitrile copolymer polyamines. Exemplary suitable polyether polyamines are poly(oxybutylene)diamine, poly(oxyethylene) diamine, poly(oxypropylene)diamine, poly(oxypropylene) triamine, poly(oxypropylene) tetramine, and combinations thereof, for examples, block copolymers of poly(oxypropylene) and poly(oxyethylene) functionalized with at least two amine groups. Preferred polyether polyamines are poly(oxypropylene) triamines having a number average molecular weight of at least about 5000.

The telechelic polyamine may be formed from a telechelic polyol by replacing the hydroxyl groups with amine groups according to the procedures described in U.S. Pat. Nos. 3,155,728 and 3,236,896. Due to the process for forming these compounds, it is expected that there may be some residual hydroxyl groups. Alternatively, nitrile-containing polymers may be amine-functionalized by reduction of the nitrile groups, and formyl-containing polymers may be amine-functionalized by reductively aminating the formyl groups.

Suitable polyfunctional acid halides useful for preparing lactam polymerization initiators are of the formula:

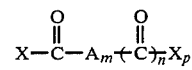

wherein m is 0 or 1 and when m is 0, n is 0 or 1 and p=1 and when m is 1, n is in the range of 1 to 3 and p=n; and X is chlorine or bromine. Advantageously m and n are 1. A can be any aliphatic or aromatic hydrocarbyl or hydrocarbyl ether group. Preferred A groups are para- and meta-phenylene and $-(CH_2)_x-$ wherein x is in the range of 3 to 8; more preferred are para- and meta-phenylene and mixtures thereof, which yield nylon block copolymers with superior physical properties. Another preferred diacid halide contains the oxalyl radical which results when m=0 and n=1.

Suitable lactams for reacting with the complexed acid halide are those having $C_3$ to $C_{11}$ alkylene groups, and preferred, based on their reactivity and availability, are those having $C_3$ or $C_5$ alkylene groups, i.e. 2-pyrrolidinone or ε-caprolactam.

Exemplary of tertiary amines which may be used to complex with the polyfunctional acid halides are trialkyl amines, pyridine and alkyl-substituted pyridines, quinoline, and other substituted amines wherein the substituents do not substantially interfere with the function of the amine as a complexing agent or with the formation of the lactam polymerization initiator. Advantageously the ammonium salt and any excess tertiary amine are removed following formation of the initiator.

The lactam polymerization initiators are advantageously prepared by the reaction of one equivalent of telechelic polyamine, based on the number of amine groups, with one equivalent of acid halide, based on the number of acid halide groups. However, when polymeric lactam polymerization initiators with backbones containing alternating hard and soft segments are desired, a polyfunctional acid halide may be reacted to link two or more of the telechelic polyamines. In such a case, the equivalent ratio of telechelic polyamine to acid halide may be selected less than 1:1. For example when the telechelic polyamine is trifunctional and a difunctional acid halide is added to couple two polyamines, an equivalent ratio of 1:3 may be used to advantage to provide an polymeric tetrafunctional initiator. The above referred to soft segments preferably conform to the molecular weight limitations discussed above generally for the telechelic polyamines.

The lactam polymerization initiator can be reacted with lactam monomer, preferably ε-caprolactam, in the presence of a lactam polymerization catalyst to form a nylon block copolymer having soft and hard segments, wherein the hard segments are represented by the formula:

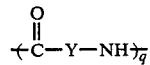

wherein q is from about 4 to about 300 and Y is as previously specified and wherein the hard and soft segments are linked by amide linkages of the formula:

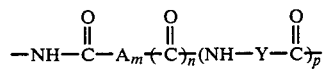

wherein A, Y, m, n and p are as previously specified. Such a block copolymer is substantially free of ester linkages between the hard and soft segments and is more hydrolytically and thermally stable than those containing such ester linkages.

The weight average molecular weight of the resulting nylon block copolymer may vary widely and is advantageously in the range from about 18,000 to about 100,000. The molecular weight is generally dependent upon the molar ratio of lactam monomer and lactam polymerization initiator. The concentration of initiator, or activated N-lactam, groups provided by the lactam polymerization initiator and present during the polymerization of lactam monomer will affect the overall reaction rate. The total amount of activated N-lactam groups, i.e. equivalents of initiator groups, may be varied by means of the functionality and/or the concentration of initiator present in the mixture. Generally, the functionality, or number of activated N-lactam groups per molecule, of the initiator is at least two, preferably from about 2 to about 10, and still more preferably from about 3 to about 6. Generally, the amount of lactam polymerization initiator used is at least about 0.1 mole percent of the total molar amount of caprolactam monomer used, and more preferably, from 0.25 to 1.0 mole percent.

When the lactam polymerization initiator is used to prepare nylon-6 block copolymers by the reaction with ε-caprolactam monomer in the presence of a suitable catalyst, the resulting block copolymer is generally comprised of the lactam polymerization initiator to which are attached polyamide chains having repeat units of the general structure:

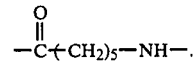

While the nylon-6 block copolymer is essentially prepared from ε-caprolactam, other lactam monomers may be included so long as the reaction rate or degree of caprolactam polymerization is not substantially impaired.

The lactam polymerization catalyst useful herein includes that class of compounds commonly recognized as suitable basic catalysts for the anionic polymerization of lactams. In general, all alkali or alkaline earth metals are effective either in metallic form or in the form of hydrides, halohydrides, alkylhalides, oxides, hydroxides, carbonates and the like. Such catalysts are more fully described in U.S. Pat. No. 4,031,164. Particularly useful for the lactam polymerization is a $C_3$ to $C_{11}$ lactam magnesium halide, preferably derived from lactam selected from the group consisting of ε-caprolactam and 2-pyrrolidinone and more preferably the catalyst is selected from ε-caprolactam magnesium bromide, (2-oxo-1-tetrahydroazepinyl magnesium bromide), and 2-pyrrolidinone magnesium bromide, (2-oxo-1-pyrrolidinyl magnesium bromide) The amount of catalyst used is an amount which gives an appreciable rate of polymerization. Advantageously, the amount of magnesium lactam polymerization catalyst for the practice of the present invention is in the range of 0.3 to 2.0 mole percent based on the total molar amount of lactam monomer and, preferably, from about 0.6 to about 1.2 mole percent. The reaction rate is dependent upon the concentration of catalyst being used and other parameters such as the temperature at which the reaction is being carried out.

The nylon block copolymer is preferably formed by a reactive fabrication process, such as reaction injection molding (RIM) but may also be formed by other conventional methods, such as casting or mass polymerization.

In a preferred method for preparing a nylon block copolymer according to the invention a first reactant stream of lactam monomer and lactam polymerization initiator and a second reactant stream of lactam and lactam magnesium halide polymerization catalyst are admixed to bring them into reactive contact at the polymerization temperature, for example, at a temperature in the range of from about 70° C. to about 230° C., preferably from about 90° C. to about 190° C., and more preferably, about 120° C. to about 160° C. In accordance with a particular method of preparing a nylon block copolymer, the above described admixture is immediately introduced into a mold which is maintained at the polymerization temperature until the lactam monomer has polymerized. Typically, by selecting a lactam polymerization initiator, adjusting the polymerization temperature and/or by adjusting the amount of lactam magnesium halide polymerization catalyst or lactam polymerization initiator, the lactam monomer polymerization may be initiated and completed within a relatively short period of time of less than 5 minutes. When the lactam polymerization initiator is one of the present invention, containing amide rather than ester linkages and formed by the process disclosed herein, the polymerization time may be reduced to less than 3 minutes, preferably less than 1 minute.

The physical properties given for the following examples were obtained using tests substantially in accordance with the following procedures:

Standard Exotherm: The reaction rate of lactam monomer polymerization is determined from the exotherm of the reaction by the following method: A 30 gauge iron constantan thermocouple connected to a recording potentiometer, is positioned within a mold. The mold is heated to 140° Celcius (C). A mixture of caprolactam monomer, lactam polymerization initiator and magnesium lactam polymerization catalyst is heated to about 100° C. and is introduced into the mold and the temperature response is recorded. The thermal trace starts an immediate rise due to heat contributed by the mold and the initial exotherm of the lactam polymerization. Before the temperature levels, a second sharp rise may occur, which is believed to be due to heat of crystallization and heat from the final stage of polymerization. The polymerization is considered to be complete when the temperature reaches a maximum and starts to fall. The mass is quite solid and the molded article may now be removed from the mold. The reaction time is the time interval between the addition of the reaction mixture to the mold and the attainment of maximum temperature. The overall reaction rate is considered to be proportional to the time for the temperature rise.

Tensile Strength: ASTM 1708 (units are in newton/meter$^2$).

Elongation, Fail: ASTM 1708 (units are in percent).

Izod Impact Strength (notched): ASTM D256 (units are in joules/centimeter, J/cm).

EXAMPLE 1

Example 1 illustrates the preparation of a lactam polymerization initiator and a nylon block copolymer therefrom according to the invention.

In a 2-liter, 4-neck flask fitted with a mechanical stirrer, condenser, N$_2$ inlet, dropping funnel, and thermocouple, 60.9 g terephthaloyl chloride and 400 ml tetrahydrofuran (THF) are mixed, and then 60.6 g triethylamine in 200 ml THF are added dropwise over a period of 1 hr. 10 min., over which time the temperature increases from 15° to 21° C. This mixture is stirred at 21° C. for 1 hr. 15 min., 33.9 g ε-caprolactam in 100 ml THF is added dropwise over a period of 43 min., over which time the temperature increases to 37° C., and then the mixture is stirred for 1 hr., during which time the temperature drops to 23° C. At 23° C., 500 g poly(oxypropylene) triamine having a number average molecular weight of 5000, available from Texaco Chemical Company, P.O. Box 430, Bellaire, Tex. 77401 under the tradename JEFFAMINE ® T-5000, in 200 ml THF is added dropwise over a period of 1 hr. 7 min., during which time the temperature increases to 30° C. The product is then stirred approximately 19 hrs., filtered, washed, stripped to constant weight, and dried.

To make a nylon block copolymer using a reaction injection molding apparatus, a first mixture of 91.6 g. lactam polymerization initiator, prepared as above, and 158.4 g ε-caprolactam and a second mixture of 27 g of a 1M caprolactam magnesium bromide solution in caprolactam and 128.4 g ε-caprolactam are heated to 100° C., while stirring, and, when homogeneous, are deaerated for at least 10 minutes at approximately 1 mm vacuum. Both mixtures are then transferred to first and second 100° C. reservoirs and are pumped through a Kenics-type mixer into a 140° C. mold to form a 25 cm×25 cm×0.32 cm plaque. Reaction time and the mechanical properties of the resulting nylon block copolymer plaque are given in Table 1.

EXAMPLE 2

Example 2 is also according to the invention but differs from Example 1 in that the initiator lactam terminal groups are provided by 2pyrrolidinone rather than ε-caprolactam.

In a 1-liter, 4-neck flask fitted with a mechanical stirrer, condenser, N$_2$ inlet, dropping funnel, and thermocouple 24.4 g terephthaloyl chloride and 160 ml THF are mixed, and then 24.2 g triethylamine in 80 ml THF are added dropwise over a 1 hour period, over which time the temperature increases from 19° to 23° C. This mixture is then stirred for 1 hour at 23° C., and then 10.2 g 2-pyrrolidinone in 40 ml THF is added dropwise over a 1 hour period, over which time the temperature increases to 33° C., and then is stirred for 1 hour, during which time the temperature drops to 24° C. At 24° C., 200 g poly(oxypropylene) triamine, further described in Example 1, in 80 ml THF is added dropwise over a 50 minute period, during which time the temperature increases to 35° C. The product is then stirred for 2.5 hours, filtered, washed, stripped to constant weight, and dried.

To make a nylon block copolymer from the initiator formed in Example 2 in the same apparatus as used in Example 1, the procedure of Example 1 is followed, except that 90.3 g initiator and 109.7 g ε-caprolactam are combined in the first reservoir; and 27 g of a 1M caprolactam magnesium bromide solution in caprolactam and 178.4 g ε-caprolactam are combined in the second. The mechanical properties of the resulting nylon block copolymer plaque are given in Table 1.

EXAMPLE 3

Example 3 is according to the invention and is prepared by the same route and using the same proportions as in Example 1 except that 50.8 g terephthaloyl chloride, 50.5 g triethylamine and 28.3 g ε-caprolactam are used to prepare the initiator and the polyamine is poly(oxypropylene) diamine, having a number average molecular weight of 4000, available under the tradename JEFFAMINE ® D-4000. The nylon block copolymer plaque is prepared as in Example 1 and its mechanical properties are given in Table 1. The lower impact strength and elongation at fail, when compared to those of Examples 1 and 2, are attributed to the use of the diamine of Example 3 in place of the polyamine of Examples 1 and 2.

EXAMPLE 4

Example 4, which illustrates the preparation of a nylon block copolymer by reacting the polyamine, the bis-acyllactam, and the lactam monomer simultaneously, is not according to the invention. The results of this example, when compared to those for the examples which are according to the invention, illustrate the necessity for substantially forming the lactam polymerization initiator prior to polymerization of the lactam monomer, as is accomplished by the process of the invention.

To make a nylon block copolymer in the same apparatus as is used in Example 1, 79.9 g of the poly(oxypropylene)triamine (Jeffamine ® T-5000), 153 g ε-caprolactam, and 17.1 g isophthaloyl bis-acyllactam (added just prior to injection) are combined at 100° C. in the first reservoir, and 27.9 g of a 1M solution of caprolactam magnesium bromide in caprolactam and 128.4 g ε-caprolactam are combined at 100° C. in the second. The two mixtures are then pumped into a 140° C. mold, as in Example 1. Reaction time and the mechanical properties of the resulting nylon block copolymer plaque are given in Table 1.

EXAMPLE 5

Example 5, which illustrates the preparation of a nylon block copolymer by first reacting the bis-acyllactam and the polyamine at an elevated temperature prior to lactam polymerization but not by the reaction route of the invention.

The nylon block copolymer of Example 5 is prepared substantially in accordance with that described in Example 4, except that the isophthaloyl bis-acyllactam, poly(oxypropylene)triamine, and ε-caprolactam in the first reservoir are heated for 4 hours at 100° C. and then degassed prior to injection. The results of this example, given in Table 1, when compared to those for Examples 1 and 2, illustrate the improved impact strength obtained when the nylon block copolymer is prepared according to the process of the invention.

TABLE I

| Example | Tensile* Yield | Tensile* Fail | Elongation Fail, % | Izod Impact** | Reaction Time, Sec. |
|---|---|---|---|---|---|
| 1 | 4.9 × 10⁷ | 4.5 × 10⁷ | 79 | 6.63 | 100 |
| 2 | 5.3 × 10⁷ | 5.0 × 10⁷ | 160 | 5.62 | — |
| 3 | 5.1 × 10⁷ | 4.7 × 10⁷ | 29.3 | 1.30 | — |
| 4 (Control) | — | 0.87 × 10⁷ | 10.9 | 0.54 | — |
| 5 (Control) | 6.0 × 10⁷ | 5.3 × 10⁷ | 150 | 1.82 | 74 |

*newton/meter$^2$
**(notched) joules/cm

In Table 1, the notation "---" indicates that the measurement was not made.

We claim:

1. The composition comprising:
a lactam monomer; and
the lactam polymerization initiator having at least two lactam terminal groups of the formula:

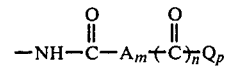

wherein Q is a lactam residue containing a $C_3$–$C_{11}$ alkylene group and bonded to a carbonyl through the nitrogen atom of the lactam; A is an aliphatic or aromatic hydrocarbyl or hydrocarbyl ether group; m is 0 or 1; when m is 0, n is 0 or 1 and p is 1; when m is 1, n is in the range of 1 to 3 and p=n; and an elastomeric backbone derived from a telechelic polyamine containing at least two primary or secondary amine groups.

2. The composition of claim 1 wherein the telechelic polyamine is selected from the group consisting of polyoxyalkylene polyamines, oxyalkylene copolymer polyamines, polyalkadiene polyamines, alkadiene copolymer polyamines, polyalkene polyamines, alkene copolymer polyamines, and combinations thereof.

3. The composition of claim 1 wherein at least 90 mole % of the amine groups have been reacted to form the lactam terminal groups.

4. The composition of claim 1 wherein at least 95 mole % of the amine groups have been reacted to form the lactam terminal groups.

5. The composition of claim 1 wherein m and n are 1.

6. The composition of claim 4 wherein m and n are 1.

7. The composition of claim 1 wherein m and n are 1 and A is meta- or para-phenylene.

8. The composition of claim 4 wherein m and n are 1 and A is meta- or para-phenylene.

9. The composition of claim 1 wherein the telechelic polyamine has a number average molecular weight greater than about 300.

10. The composition of claim 1 wherein the telechelic polyamine has a number average molecular weight greater than about 10000.

11. The composition of claim 1 wherein the telechelic polyamine has at least three amine groups.

12. The composition of claim 3 wherein the telechelic polyamine has at least three amine groups.

13. The composition of claim 11 wherein m and n are 1 and A is meta- or para-phenylene.

14. The composition of claim 1 wherein A is a $C_3$ to $C_8$ hydrocarbyl radical.

15. The composition of claim 1 wherein A is a hydrocarbyl radical selected from the group consisting of para-phenylene, meta-phenylene, and $-(CH_2)_x-$, wherein x is in the range of 3 to 8.

16. The composition of claim 1 additionally comprising a substituted ammonium halide.

17. The composition comprising:
a lactam monomer; and
a lactam polymerization initiator represented by the formula:

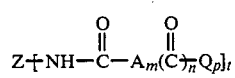

wherein Z is a polyvalent radical derived from a telechelic polymine containing at least 2 primary or secondary amine groups selected from the group consisting of polyoxyalkylene polyamines, oxyalkylene copolymer polyamines, polyalkadiene polyamines, alkadiene copolymer polyamines, polyalkene polyamines, alkene copolymer polyamines, and combinations thereof; A is an aliphatic or aromatic hydrocarbyl or hydrocarbyl ether group; Q is a lactam residue containing a $C_3$ to $C_{11}$ alkylene group; t is at least 1; m is 0 or 1, when m is 0, n is 0 or 1 and p is 1 and when m is 1, n is in the range of 1 to 3 and p=n.

18. The composition of claim 17 wherein m and n are 1 and A is meta-or para-phenylene.

19. The composition of claim 17 wherein the telechelic polyamine has a number average molecular weight of at least about 300.

20. The composition of claim 17 wherein the telechelic polyamine has a number average molecular weight of at least about 1000.

21. The composition of claim 17 wherein the telechelic polyamine has at least 3 primary or secondary amine groups.

22. The composition of claim 17 additionally comprising a substituted ammonium halide.

23. The process comprising: preparing a lactam polymerization initiator by:
   (a) complexing the acid halide groups of a polyfunctional acid halide with a tertiary amine;
   (b) reacting at least one but less than all of the complexed acid halide groups with a lactam monomer represented by the formula

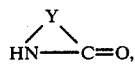

where Y is a $C_3$ to $C_{11}$ alkylene group to replace the halogen with a lactam residue and form an ammonium halide salt;
   (c) reacting at least 90 mole % of the remaining complexed acid halide groups with a polyamine having at least 2 primary amine groups to form amine groups and ammonium halide salt;
   (d) removing the ammonium halide salt and obtaining the lactam polymerization initiator; and
   reacting the lactam polymerization initiator with lactam monomer in the presence of a lactam polymerization catalyst to form a nylong block copolymer having block linkages of the formula;

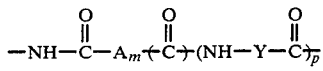

wherein Y is a $C_3$–$C_{11}$ alkylene group, A is an aromatic or aliphatic hydrocarbyl or hydrocarbyl ether group, and m is 0 or 1; when m is 0, n is 0 or 1 and p is 1; and when m is 1, n is in the range of 1 to 3 and p=n.

24. The process of claim 23 wherein about 50 mole % of the halogen groups of the complexed acid halide are replaced with a lactam residue in step (b).

25. The nylon block copolymer formed by the process of claim 23.

26. A nylon block copolymer, comprising soft and hard segments, wherein the hard segments consist essentially of segments of the formula:

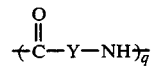

wherein q=4 to 300, and Y is a $C_3$–$C_{11}$ alkylene group and the soft segments contribute a $T_g$ of less than 0° C.; and wherein the soft and hard segments are linked by segments consisting essentially of:

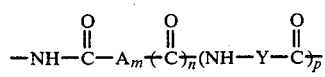

wherein Y is a $C_3$–$C_{11}$ alkylene group, A is an aromatic or aliphatic hydrocarbyl or hydrocarbyl ether group, and m is 0 or 1; when m is 0, n is 0 or 1 and p is 1; and when m is 1, n is in the range of 1 to 3 and p=n.

27. The process of claim 23, wherein the lactam polymerization step is substantially complete in less than about 3 minutes.

28. The process of claim 23, wherein the lactam polymerization step is substantially complete in less than about 1 minute.

29. The process of claim 23 wherein, prior to performing the lactam polymerization step, at least 95% of the lactam terminal groups of the initiator are of the formula:

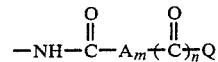

wherein A is an aromatic or aliphatic hydrocarbyl or hydrocarbyl ether group, Q is a lactam residue containing a $C_3$ to $C_{11}$ alkylene group, and m is 0 or 1; when m is 0, n is 0 or 1 and when m is 1, n is in the range of 1 to 3.

* * * * *